United States Patent Office 3,825,603
Patented July 23, 1974

3,825,603
PREPARATION OF ETHERS
Stephen N. Massie, Palatine, Ill., assignor to Universal Oil Products Company, Des Plaines, Ill.
No Drawing. Filed Feb. 22, 1972, Ser. No. 228,351
Int. Cl. C07c 41/06
U.S. Cl. 260—612 D
9 Claims

ABSTRACT OF THE DISCLOSURE

Symmetrical and unsymmetrical ethers may be prepared by the addition of an olefin to an alcohol in the presence of a catalyst comprising a vanadium-containing compound at reaction conditions which include a temperature in the range of from about 50° to about 300° C. and a pressure in the range of from about atmospheric to about 100 atmospheres.

---

This invention relates to a process for the preparation of ethers. More specifically the invention is concerned with a process for preparing symmetrical and unsymmetrical ethers by reacting an olefin with an alcohol in the presence of certain catalytic compositions of matter.

Oxygen-containing compounds, and particularly ethers, form valuable articles of commerce. For example, dialkyl ethers either symmetrical or unsymmetrical in configuration will find use as solvents in industry while alkylaryl ethers are used as pharmaceuticals, antioxidants, antiozonants and ultra-violet light stabilizers. For example, an unsymmetrical dialkyl ether such as $t$-butyl methyl ether, by virtue of its low boiling point, that is 55° C. and its high blending octane number, namely, 123 (10% in 91.4 octane unleaded gasoline) is potentially valuable for compounding in motor fuels such as gasolines and particularly for upgrading unleaded motor fuels.

It is therefore an object of this invention to provide a process for preparing oxygen-containing compounds such as ethers.

Another object of this invention is to provide a process for the preparation of symmetrical or unsymmetrical ethers utilizing alcohols and olefins as starting materials, the process being effected in the presence of certain catalytic compositions of matter.

In one aspect an embodiment of this invention resides in a process for the preparation of an ether which comprises reacting an olefin with an alcohol in the presence of a catalyst comprising a vanadium-containing compound at reaction conditions, and recovering the resultant ether.

A specific embodiment of this invention is found in a process for the preparation of an ether which comprises reacting isobutylene with methyl alcohol in the presence of vanadyl acetylacetonate at a temperature in the range of from 50° to about 300° C. and a pressure in the range of from about atmospheric to about 100 atmospheres, and recovering the resultant $t$-butyl methyl ether.

Other objects and embodiments will be found in the following further detailed description of the present invention.

As hereinbefore set forth the present invention is concerned with a process for preparing ethers which may be dialkyl, arylaralkyl, or arylalkyl, the dialkyl ethers being symmetrical or unsymmetrical in nature. Specifically speaking the preparation of these ethers is accomplished by the addition of alcohols to olefins in the presence of certain vanadium-containing compounds, particularly vanadium-containing compounds in which the vanadium is in a valence state of zero or in a higher valence state. Specific examples of these catalysts comprising a vanadium-containing compound will be hereinafter set forth in greater detail.

Examples of olefins which may be employed as one of the starting materials of the present process include both normally gaseous and normally liquid olefins containing from 2 up to about 16 carbon atoms such as the open chain olefins including ethylene, propylene, 1-butene, isobutylene, 2-butene, 1-pentene, 2-pentene, 1-hexene, 2-hexene, 3-hexene, 1-heptene, 2-heptene, 3-heptene, 1-octene, 2-octene, 3-octene, 4-octene, 1-nonene, 2-nonene, 3-nonene, 4-nonene, 1-decene, 2-decent, 3decene, 4-decene, 5-decene, the isomeric undecenes, dodecenes, tridecenes, tetradecenes, pentadecenes, hexadecenes, as well as branched chained isomers of the normal olefins, etc. cyclopentene, cyclohexene, cycloheptene, aryl-substituted alkenes such as allylbenzene, etc.

Examples of alcohols which may be utilized in the reaction with the aforementioned olefins will include aliphatic alcohols such as methyl alcohol, ethyl alcohol, propyl alcohol, isopropyl alcohol, $n$-butyl alcohol, sec-butyl alcohol, $n$-amyl alcohol, sec-amyl alcohol, $n$-hexyl alcohol, isohexyl alcohol, $n$-heptyl alcohol, isoheptyl alcohol, $n$-octyl alcohol, the isomeric isooctyl alcohols, the isomeric nonyl alcohols, etc. hydroxy substituted aromatic compounds such as phenol, $o$-cresol, $m$-cresol, $p$-cresol, benzyl alcohol, 2-phenylethyl alcohol, 3-phenylpropyl alcohol, 4 phenylbutyl alcohol, etc. It is to be understood that the aforementioned olefins and alcohols are only representative of the classes of compounds which may be employed as reactants, and that the present invention is not necessarily limited thereto.

The catalysts which are to be employed to effect the addition of the alcohols to the olefins will comprise vanadium-containing compounds in which the vanadium is present in a zero valence state or in a higher valence state. Some representative examples of these compounds will include the carbonyl compounds of zero valence vanadium such as vanadium carbonyl, benzene vanadium tetracarbonyl, toluene vanadium tetracarbonyl, $o$-xylene vanadium tetracarbonyl, $m$-xylene vanadium tetracarbonyl, $p$-xylene vanadium tetracarbonyl, bis(benzene) vanadium, bis(toluene) vanadium, bis(mesitylene) vanadium, vanadium tetroxide, vanadium pentoxide, vanadyl oxalate, vanadyl acetylacetonate, tributylvanadate, etc. It is to be understood that the aforementioned examples of vanadium is a zero valence state and in a higher valence state are only representative of the class of catalytic compounds which may be used, and that the present invention is not necessarily limited thereto.

The aforementioned addition of the alcohols to the olefin in the presence of a catalyst comprising a vanadium-containing compound will be effected at reaction conditions which include an elevated temperature in the range of from about 50° to about 300° C. and at a pressure in the range of from about atmospheric up to about 100 atmospheres or more. When utilizing superatmospheric pressures as one of the reaction conditions, the pressure may be afforded by the autogenous pressure of the olefin, alcohol, or both, if in the gaseous state. However, if both of the starting materials are in liquid state, said superatmospheric pressures may be provided by the introduction of a substantially inert gas such as nitrogen into the reaction zone, the amount of pressure which is used being that which is sufficient to maintain a major portion of the reactants in a liquid phase.

The process of this invention may be effected in any suitable manner and may comprise either a batch or continuous type operation. For example, when a batch type operation is used, the alcohol and the catalyst are placed in an appropriate apparatus such as, for example, an autoclave of the rotating or mixing type. Certain air and water unstable catalysts should be protected during transfer by any of the methods known to one skilled in the art. Thereafter the olefin whether in gaseous or liquid form is charged to the reactor which is thereafter heated to the desired operating temperature, the superatmospheric pressure being afforded by the olefin if in gaseous form. Alternatively speaking, if the olefin is in liquid form and superatmospheric pressures are desired, said pressure is provided for by the introduction of nitrogen into the reactor prior to heating to the desired temperature. After maintaining the reactor at the desired operating conditions for a residence time which may range from 0.5 up to about 20 hours or more in duration, heating is discontinued and the reactor and contents thereof are allowed to return to room temperature. Any excess pressure which may still be present is discharged and the reaction mixture is recovered. The mixture, after being separated from the catalyst by conventional means such as filtration (when the catalyst remains as a solid after the reaction), is then subjected to conventional means of separation which may include washing, drying, extraction, fractional distillation, fractional crystallization, etc. whereby the desired ether is separated from any unreacted starting materials and/or side reaction products which may have formed and is recovered.

It is also contemplated within the scope of this invention that the process of this invention may be effected in a continuous manner of operation. When this type of operation is employed, a quantity of the vanadium-containing compound is placed in an appropriate apparatus which is maintained at the proper operating conditions of temperature and pressure. The reactants comprising an olefin and an alcohol are continuously charged to this reactor through separate lines, or if so desired, they may be admixed prior to entry into said reactor and charged thereto in a single stream. Upon completion of the desired residence time in the reactor, the reactor effluent is continuously withdrawn and subjected to separation means of the type hereinbefore set forth in greater detail whereby the desired ether is separated and recovered, the unreacted starting materials being recycled to form a portion of the feed stock. If the vanadium-containing compound which is to be used as a catalyst is in solid form, it is possible to effect a continuous manner of operation in a number of ways. One way is to employ the catalyst as a fixed bed in the reactor and pass the reactant through the catalyst bed in either an upward or downward flow. Another method of effecting the present process is to utilize the catalyst as a moving bed in the reactor and pass the reactant and the catalyst either concurrently or countercurrently to each other through the reactor. Alternatively the catalyst may also be charged to the reactor as a slurry or in solution in one or both of the starting materials.

Examples of symmetric and unsymmetric dialkyl, arylaralkyl or alkylaryl ethers which may be prepared according to the process of this invention will include: ethyl methyl ether, isopropyl methyl ether, *sec*-butyl methyl ether, *t*-butyl methyl ether, *sec*-amyl methyl ether, *sec*-hexyl methyl ether, *sec*-heptyl methyl ether, *sec*-octyl methyl ether, *sec*-nonyl methyl ether, *sec*-decyl methyl ether, diethyl ether, propyl ethyl ether, *sec*-butyl ethyl ether, *t*-butyl ethyl ether, *n*-amyl ethyl ether, *sec*-amyl ether, *n*-hexyl ethyl ether, *sec*-hexyl ethyl ether, *n*-heptyl ethyl ether, *sec*-heptyl ethyl ether, *n*-octyl ethyl ether, *sec*-octyl ethyl ether, *n*-nonyl ethyl ether, *sec*-nonyl ethyl ether, *n*-decyl ethyl ether, *sec*-decyl ethyl ether, diisopropyl ether, isopropyl *n*-propyl ether, *sec*-butyl *n*-propyl ether, *t*-butyl *n*-propyl ether, *sec*-amyl propyl ether, *sec*-hexyl propyl ether, *sec*-heptyl propyl ether, *sec*-octyl propyl ether, *sec*-nonyl propyl ether, *sec*-decyl propyl ether, *t*-butyl 2-methyl-1-propyl ether, ethyl phenyl ether, isopropyl phenyl ether, *sec*-butyl phenyl ether, *t*-butyl phenyl ether, *t*-amyl phenyl ether, *sec*-amyl phenyl ether, *t*-hexyl phenyl ether, ethyl benzyl ether, isopropyl benzyl ether, *sec*-butyl benzyl ether, *t*-butyl benzyl ether, ethyl *p*-tolyl ether, isopropyl *p*-tolyl ether, *t*-butyl *p*-tolyl ether, ethyl *o*-tolyl ether, isopropyl *o*-tolyl ether, *t*-butyl *o*-tolyl ether, ethyl *m*-tolyl ether, isopropyl *m*-tolyl ether, *t*-butyl *m*-tolyl ether, etc. In the preferred embodiments of this invention, primary alcohols are reacted with 1,1-dialkylethylenes or 1,1,2-trialkylethylenes to form primary-alkyl tertiary-alkyl ethers.

The following examples are given to illustrate the process of the present invention which, however are not intended to limit the generally broad scope of the present invention in strict accordance therewith.

EXAMPLE I

In this example 32 g. (1.0 mole) of methyl alcohol, and 1 g. of vanadyl acetylacetonate were charged to the glass liner of a rotating autoclave. The glass liner was sealed into the autoclave, flushed with nitrogen and thereafter 56 g. (1.0 mole) of isobutylene were added. The autoclave was then pressured with an additional 35 atmospheres of nitrogen and heated to a temperature of 180° C. The autoclave was maintained at this temperature for a period of 16 hours, at the end of which time heating was discontinued and the autoclave was allowed to return to room temperature. The excess pressure was discharged, the autoclave was opened and the reaction mixture was recovered therefrom. The mixture was separated from the catalyst and the liquid was then subjected to gas-liquid chromatographic analysis, said analysis disclosed the presence of the desired compound comprising *t*-butyl methyl ether.

EXAMPLE II

The above example was repeated by charging 64 g. (2.0 mole) of methyl alcohol and 5 g. of a catalyst comprising vanadium pentoxide on alumina to the glass liner of a rotating autoclave. The glass liner was sealed into the autoclave and flushed with nitrogen. Thereafter 112 g. (2.0 mole) of isobutylene was added followed by a sufficient amount of nitrogen so that the initial operating pressure was 35 atmospheres. The autoclave was then heated to a temperature of 140° C. and maintained thereat for a period of 16 hours. At the end of this time heating was discontinued, the autoclave was allowed to return to room temperature and the excess pressure was discharged. The autoclave was opened and the reaction mixture was recovered therefrom followed by separation from the solid catalyst. Analysis of the liquid product by means of a gas-liquid chromatograph disclosed the presence of the desired product comprising *t*-butyl methyl ether.

EXAMPLE III

A mixture of 64 g. (2.0 mole) of methyl alcohol and 1 g. of a catalyst comprising vanadium carbonyl is placed in the glass liner of a rotating autoclave. The autoclave is sealed, flushed with nitrogen and 84 g. (2.0 mole) of propylene is charged thereto. Following this the autoclave is further pressured with nitrogen until an initial operating pressure of 35 atmospheres is reached and the autoclave is then heated to a temperature of 180° C. The autoclave and contents thereof are maintained at this temperature for a period of 16 hours, at the end of which time heating is discontinued and the autoclave is allowed to return to room temperature. The excess pressure is discharged, the autoclave is opened and the reaction mixture is recovered therefrom. The reaction product is then separated from the catalyst by means of filtration and the liquid prdouct is subjected to gas-liquid chromatographic analysis which shows the presence of isopropyl methyl ether.

EXAMPLE IV

To the glass liner of a rotating autoclave is charged 94 g. (1.0 mole) of a phenol and 1 g. of vanadyl acetylacetonate. The autoclave is sealed, flushed with nitrogen and 56 g. (1.0 mole) of isobutylene is charged thereto. As in the previous examples the autoclave is pressurized with 35 atmospheres of nitrogen and heated to a temperature of 180° C., the autoclave and contents being maintained at this temperature for a period of 16 hours. At the end of this time, heating is discontinued and the autoclave is allowed to return to room temperature. The excess pressure is discharged, the autoclave is opened and the reaction mixture is recovered therefrom. The product is treated in a manner similar to that set forth in the above examples, whereby the product of the desired compound comprising $t$-butyl phenyl ether is shown by means of gas-liquid chromatographic analysis.

EXAMPLE V

In a similar manner 50 g. (1.0 mole) of $n$-propyl alcohol and 2 g. of a catalyst consisting of vanadium pentoxide composited on an alumina are placed in the glass liner of a rotating autoclave which is then sealed and flushed with nitrogen. The other component of the reaction, namely, 56 g. (1.0 mole) of isobutylene is then charged to the autoclave and nitrogen is pressed in until an initial pressure of 35 atmospheres is reached. After heating the autoclave to a temperature of 180° C. and maintaining the same thereat for a period of 16 hours, heating is discontinued and the autoclave is allowed to return to room temperature. The excess pressure is discharged, the autoclave is opened and the reaction mixture is recovered therefrom. After separation of the liquid product from the catalyst by means of filtration, the former is subjected to gas-liquid chromatographic analysis which discloses the presence of the desired product comprising $t$-butyl $n$-propyl ether.

EXAMPLE VI

A mixture consisting of 37 g. (0.5 mole) of isobutyl alcohol and 1 g. of vanadyl acetylacetonate is placed in the glass liner of a rotating autoclave. The autoclave is sealed, flushed with nitrogen and 56 g. (1.0 mole) of isobutylene is charged thereto. The autoclave is heated to a temperature of 140° C. and maintained thereat for a period of 16 hours. At the end of this time, heating is discontinued, the autoclave is allowed to return to room temperature, and the excess pressure is discharged. The reaction mixture is recovered, separated from the catalyst by filtration and the liquid product is subjected to fractional distillation to recover the desired product comprising $t$-butyl isobutyl ether.

I claim as my invention:

1. A process for the preparation of an ether which comprises reacting an olefin of from 2 to about 16 carbon atoms with a hydroxy compound selected from the group consisting of aliphatic alcohols of from 1 to 9 carbon atoms and hydroxy substituted mono-nuclear aromatic compounds at a temperature of from about 50° to about 300° C. and a pressure of from about atmospheric to about 100 atmospheres in contact with a catalytic vanadium-containing compound selected from the group consisting of vanadium carbonyl, benzene vanadium tetracarbonyl, toluene vanadium tetracarbonyl, o-xylene vanadium tetracarbonyl, m-xylene vanadium tetracarbonyl, p-xylene vanadium tetracarbonyl, bis(benzene) vanadium, bis(toluene) vanadium, bis(mesitylene) vanadium, vanadium tetroxide, vanadium pentoxide, vanadyl oxalate, vanadyl acetylacetonate and tributylvanadate, and recovering the resultant ether.

2. The process as set forth in Claim 1 in which said vanadium-containing compound is vanadyl acetylacetonate.

3. The process as set forth in Claim 1 in which said vanadium-containing compound is vanadium pentoxide.

4. The process as set forth in Claim 1 in which said vanadium-containing compound is vanadium carbonyl.

5. The process as set forth in Claim 1 in which said olefin is isobutylene, said hydroxy compound is methyl alcohol and said ether is $t$-butyl methyl ether.

6. The process as set forth in Claim 1 in which said olefin is propylene, said alcohol is methyl hydroxy compound and said ether is isopropyl methyl ether.

7. The process as set forth in Claim 1 in which said olefin is 1-butene, said hydroxy compound is phenol and said ether is $sec$-butyl phenyl ether.

8. The process as set forth in Claim 1 in which said olefin is isobutylene, said alcohol is $n$-propyl hydroxy compound, and said ether is $t$-butyl $n$-propyl ether.

9. The process as set forth in Claim 1 in which said olefin is isobutylene, said alcohol is isobutyl hydroxy compound and said ether is $t$-butyl isobutyl ether.

References Cited

UNITED STATES PATENTS

| | | | |
|---|---|---|---|
| 2,084,390 | 6/1937 | Dreyfus | 260—614 A |
| 2,797,247 | 6/1957 | Keith | 260—614 A |
| 2,830,090 | 4/1958 | Teter et al. | 260—614 A |

BERNARD HELFIN, Primary Examiner

U.S. Cl. X.R.

260—611 A, 611 R, 612 R, 614 R